United States Patent [19]
Child et al.

[11] 3,928,001
[45] Dec. 23, 1975

[54] PRODUCTION OF METHANE

[75] Inventors: Edward T. Child, Tarrytown, N.Y.;
Allen M. Robin, Anaheim, Calif.;
William L. Slater, La Habra, Calif.;
George N. Richter, San Marino, Calif.

[73] Assignee: Texaco Inc., New York, N.Y.

[22] Filed: Dec. 28, 1973

[21] Appl. No.: 429,471

[52] U.S. Cl.............. 48/197 R; 48/215; 252/373; 260/449 M
[51] Int. Cl.². ............................................ C10J 3/06
[58] Field of Search.......... 48/215, 197 R; 252/373; 260/449 M

[56] References Cited
UNITED STATES PATENTS

| | | | |
|---|---|---|---|
| 2,963,348 | 12/1960 | Sellers............................... | 48/197 R |
| 3,444,099 | 5/1969 | Taylor et al....................... | 48/197 R |
| 3,709,669 | 1/1973 | Marion et al. ....................... | 48/215 |
| 3,740,204 | 6/1973 | Slater et al........................... | 48/215 |
| 3,816,332 | 6/1974 | Marion ................................ | 48/215 |

*Primary Examiner*—S. Leon Bashore
*Assistant Examiner*—George C. Yeung
*Attorney, Agent, or Firm*—T. H. Whaley; C. G. Ries; Albert Brent

[57] ABSTRACT

Improved process for the production of substantially pure methane or clean synthetic natural gas (SNG) including the steps of partial oxidation of a hydrocarbonaceous fuel feed with substantially pure oxygen to produce a process gas stream comprising principally $H_2$, and CO and having a critical mole ratio $H_2/CO$ in the range of 1.0 to below 1.5 and preferably 1.0 to 1.3; cooling the process gas stream and separating $H_2O$, $CO_2$ particulate carbon and gaseous impurities therefrom, reacting together the $H_2$ and CO in said process gas stream in a catalytic methanation zone to produce a methane-rich gas stream containing gaseous impurities selected from the group consisting primarily of $H_2O$, and $CO_2$, along with minor amounts of $H_2$, CO, $N_2$, and Ar and mixtures thereof; and removing said $H_2O$ and $CO_2$ to produce a product gas stream comprising substantially pure methane i.e. 95 mole % or higher (dry basis). The product gas may be used as a clean substitute natural gas having a gross heating value of about 980 BTU/SCF or higher.

12 Claims, No Drawings

3,928,001

PRODUCTION OF METHANE

BACKGROUND OF THE INVENTION

1. Field of the Invention

This invention relates to a continuous process for the production of substantially pure methane. More specifically, the present invention relates to the production of gaseous heating fuels such as synthetic natural gas (SNG) having a gross heating value of about 980 BTU per SCF or higher from low cost hydrocarbonaceous materials. The SNG product may be burned without polluting the environment.

2. Description of the Prior Art

A national dilemma exists as the result of a diminishing supply of natural gas and an increasing demand for it. The impact of the gas crisis is being felt nationwide in rising prices, in governmental regulations with respect to the consumption of natural gas, and in prohibitions against the use of natural gas in future commercial, industrial and apartment-house construction. It is imperative that alternate sources of low-cost gaseous heating fuels be developed.

In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669 the synthesis gas leaving the partial oxidation gas generator is subjected to an additional step involving the water-gas shift reaction to adjust the $H_2/CO$ mole ratio to preferably 3 before catalytic methanation.

In comparison with the prior art, in the subject invention by the partial oxidation of a hydrocarbonaceous fuel with substantially pure oxygen, a process gas stream is produced having a critical and comparatively low $H_2/CO$ ratio i.e. 1 to below 1.5. After $H_2O$, $CO_2$ and gaseous impurities were removed from this process gas stream and it was subjected to catalytic methanation, a product gas stream was produced unexpectedly having a maximum gross heating value (GHV) of about 980 BTU per SCF, or higher, after it was dried and $CO_2$ was removed. One economic benefit of the subject invention is the elimination of the troublesome water-gas shift reaction considered essential by prior art processes to adjust the $H_2/CO$ ratio of the feed gas stream to the methanator.

SUMMARY

It was unexpectedly found that a noncatalytic free-flow synthesis gas generator may be operated within a narrow range so that the synthesis gas produced by the partial oxidation of a hydrocarbonaceous fuel has a mole ratio $H_2/CO$ in the range of 1 to less than 1.5, and preferably 1.0 to 1.3. The unobvious critical relationship of the feedstreams to the generator to produce said synthesis gas is as follows: a weight ratio of $H_2O$/hydrocarbonaceous fuel in the range of 0.25 to 1.7 and the atomic ratio of oxygen in the substantially pure oxygen (99 mole % $O_2$ or more) to carbon in the fuel in the range of 0.85 to 1.00.

After cooling, cleaning, and removing $CO_2$, $H_2S$, COS and $H_2O$ from the effluent gas stream from the generator, the process gas stream may be subjected to catalytic methanation. Unexpectedly, it was found that the product gas from the catalytic methanator after $H_2O$ and $CO_2$ were removed contained a maximum gross heating value i.e. about 980 BTU per SCF (British Thermal Units per Standard Cubic Foot) or higher when the mole ratio $H_2/CO$ of the feed gas to the methanator was in the range of about 1 to less than 1.5. As previously noted in the first step of the subject process, the effluent gas from the synthesis gas generator contained this critical ratio. By the subject process, a product gas stream is produced comprising at least 95 mole % $CH_4$ after $H_2O$ and $CO_2$ are removed. Further, the gas may be burned as a fuel without polluting the atmosphere.

One economic advantage of the subject process is the elimination of the water-gas shift reaction that prior art processes require to adjust the $H_2/CO$ mole ratio of the feed gas to the methanator.

DESCRIPTION OF THE INVENTION

The present invention relates to a continuous process for producing substantially pure methane i.e. 95 mole % $CH_4$ or more (dry basis), or clean synthetic natural gas.

In the first step of the process, synthesis gas comprising principally mixtures of hydrogen, carbon monoxide, carbon dioxide, water vapor, and minor amounts of one or more of the group consisting of methane, nitrogen, argon, carbonyl sufide, hydrogen and entrained particulate carbon is produced by the reaction of a hydrocarbonaceous fuel by partial oxidation with substantially pure oxygen (99 mole % or more) and $H_2O$ in the reaction zone of a free-flow synthesis gas generator free from parking or catalyst. The composition of the charge and the conditions of the reaction are controlled so as to produce an effluent gas stream containing a critical mole ratio $H_2/CO$ in the range of about 1 to less than 1.5, and from about 0.1 to 10.0 weight percent of entrained particulate carbon (basis weight of carbon in the hydrocarbonaceous fuel).

Hydrocarbonaceous fuels which are suitable feedstocks for the process include by definition asphalt, petroleum distillate and residua, naphtha, gas oil, residual fuel, reduced crude, whole crude, coal tar, coal oil, shale oil, and tar sand oil. Included also are pumpable slurries of solid hydrocarbonaceous fuels e.g. coal, particulate carbon, and petroleum coke in a liquid hydrocarbon fuel such as previously listed, or water.

$H_2O$ may be supplied to the generator in liquid or gaseous phase. It may be introduced either separately or in admixture with the free-oxygen containing gas or with the hydrocarbonaceous feedstock, or both. Water will moderate the temperature of the reaction zone and may also react with CO and the hydrocarbon fuel in the reaction zone. It was unexpectedly found that in the operation of the synthesis gas generator for producing synthesis gas by the partial oxidation of the hydrocarbonaceous fuel, a specific relationship existed between the weight ratio $H_2O$/hydrocarbonaceous fuel and the atomic ratio O/C for the substantially pure oxygen (99 mole % $O_2$ or more) in order to produce a feed gas to the methanator having a mole ratio $H_2/CO$ in the range of about 1 to less than 1.5, and preferably 1.0 to 1.3. Further, it was unexpectedly found that this mole ratio $H_2/CO$ in the feed gas to the catalytic methanator was critical with respect to producing a product gas having a maximum gross heating value. The lower limit of the mole ratio $H_2/CO$ of and the upper limit is 1.5, and preferably 1.3. Below 1.0, the percent $CH_4$ and the gross heating value (GHV) of the product gas from the methanator (less $H_2O$ and $CO_2$) fall off rapidly. When the $H_2/CO$ mole ratio is 1, the GHV is about 1000 BTU/SCF and the mole % $CH_4$ is about 99. Above a mole ratio $H_2/CO$ of 1.5 the gross heating value falls below 980 BTU/SCF and the mole % $CH_4$ falls below 95. At a mole ratio $H_2/CO$ of 1.3 the GHV is about 990 BTU/SCF and the mole % $CH_4$ is about 97.5 When the substantially pure $O_2$ contains 95 mole % $O_2$ in place of 99 mole % $O_2$ the product gas from the methanator (less $H_2O$ and $CO_2$) will have a GHV of about 920 or more and a mole % $CH_4$ of about 90 or more.

The aforesaid necessary weight ratio of $H_2O$ to hydrocarbonaceous fuel in the feed to the generator in the subject invention was found to be in the narrow range of 0.25 to 1.7 when the atomic ratio of oxygen in the free-oxygen containing gas to carbon in the hydrocarbonaceous fuel was in the narrow range of 1.85 to 1.00.

The substantially pure oxygen comprises 95 mole % $O_2$, or more. It is introduced into the reaction zone of the synthesis gas generator simultaneously with the $H_2O$ and hydrocarbonaceous fuel. Suitably, an annulus-type burner, such as described in coassigned U.S. Pat. No. 2,928,460 issued to du Bois Eastman et al., or in coassigned U.S. Pat. No. 3,743,606 issued to C. P. Marion et al., may be employed. The substantially pure oxygen may be introduced at a temperature in the range of about ambient to 1000°F. Substantially pure oxygen is used so as to avoid minor amounts of nitrogen and argon in the effluent gas. The amount of oxygen supplied to the gas generator is controlled so as to prevent complete oxidation of the hydrocarbonaceous feed and to control the temperature in the reaction zone.

The reaction zone is preferably a conventional Texaco Synthesis Gas Generator. The synthesis gas generator is free from any other obstructions to the flow of the gases therethrough. The gas generator is a cylindrically shaped vertical steel pressure vessel whose inside walls are lined with refractory. An axially aligned flanged inlet port is located at the top of the vessel, and a flanged outlet port is located at the bottom. The various feedstreams may be introduced into the gas generator at ambient temperature, but preferably they are introduced at a temperature in the range of about 100°F to 1000°F. Preferably, an annulus-type burner which is axially mounted in the top of the generator may be used for introducing and mixing the feedstreams.

Suitable gas generators are disclosed in U.S. Pat. Nos. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of the free-flow noncatalytic synthesis gas generator, reaction takes place at an autogenous temperature in the range of about 1700 to 3100°F., and preferably in the range of about 2000 to 2800°F, and at a pressure in the range of about 1 to 250 atmospheres, and preferably in the range of about 20 to 100 atmospheres.

The effluent gas stream from the gas generator has the following dry gas composition in mole %: $H_2$ 40 to 60; CO 30 to 49; $CO_2$ 2 to 20; $CH_4$ nil to 3; $H_2S$ nil to 20; COS nil to 0.1; $N_2$ nil to 0.3; Ar nil to 0.3; and from 0.1 to 10 wt. % of particulate carbon (basis C in hydrocarbonaceous fuel).

By conventional menas, the effluent gas stream from the generator is cooled, and the particulate carbon and gaseous impurities are removed. For example, the effluent gas stream may be passed through an in-line waste-heat boiler and cooled to a temperature in the range of about 400 to 800°F. by indirect heat exchange with water, thereby producing steam. The steam may be used elsewhere in the process, such as in the gas generator. Alternately, the effleunt gas stream from the gas generator may be quenched in water in a quench tank such as shown in coassigned U.S. Pat. No. 2,896,927. Advantageously, by this means a large portion of the particulate carbon and other solids entrained in the effluent gas stream is removed by the quench water.

Further, particulate carbon and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and scrubbing fluid may be recycled to the gas generator as a portion of the feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw Hill 1963, pages 18-3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers'Handbook Fourth Edition, McGraw-Hill 1963, pages 18-54 to 56 The process gas stream leaving from the top of the scrubbing tower substantially free from particulate carbon and at a temperature in the range of about 400°–650°F. is then cooled to condense out and separate any volatilized hydrocarbons and water found therein. For additional information on suitable gas scrubbing, reference is made to coassigned U.S. Pat. No. 3,639,261.

$CO_2$, $H_2O$, $H_2S$ and COS may be removed from the process gas stream in an acid-gas separation zone by a suitable conventional process involving cooling and physical or chemical absorption with solvents, such as n-methyl pyrrolidone, triethanolamine, propylene carbonate, or alternately with hot potassium carbonate. Methane should be substantially insoluble in the solvent selected. Most of the $CO_2$ absorbed in the solvent can be released by simple flashing. The stream of $CO_2$ has a purity of more than 98.5 percent and may therefore be used for organic synthesis. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly $H_2S$ and COS-containing solvent is regenerated by further flashing. The $H_2S$ and COS may be then converted into sulfur by a suitable process. For example, the Claus process may be used to produce elemental sulfur from $H_2S$, as described in Kirk-Othmer Encyclopedia of Chemical Technology, Second Edition Volume 19, John Wiley, 1969, page 352.

The substantially dry gaseous mixture from the acid gas separation zone having the following dry gas composition in mole percent is then introduced into a methanation zone: $H_2$ 50 to 60, CO 38 to 50, $CH_4$ 0 to 4, $CO_2$ 0, $N_2$+Ar 0 to less than 1, and 0 to less than 0.1 parts per million of total sulfur i.e. $H_2S$ + COS.

The catalytic production of methane from carbon monoxide and carbon dioxide is highly exothermic. Unless the heat is successfully removed from the catalyst bed, high feed-gas throughputs can produce excessive catalyst bed temperatures that can destroy the activity of the catalyst and reduce methane yields. Temperature control may be effected by any of the following techniques : distribution of the feed-gas stream throughout fixed bed reactors by means of separate inlet points, embedding tubular coolers in the catalyst beds and producing steam which may be used elsewhere in the process, cooling the effluent gas between beds with simultaneous steam generation, or by using a free-flow tubular reactor whose inside surfaces are coated with catalyst.

Another method of controlling catalyst bed temperatures while increasing the concentration of methane in the product gas consists of recycling a portion of the product gases through the catalyst bed at ratios ranging from 1–50 volumes of recycle gas per volume of fresh feed gas and preferably at recycle ratios in the range of 1 to 5.

The Group VIII transition elements, mainly iron, nickel, and cobalt, appear to be the most suitable for use as methanation catalyst. Typical commercial preparations contain about 33 to 78 weight percent of nickel oxide and about 12 to 25 percent of aluminum oxide and are used in the form of ⅜ × ⅜ or ¼ × ¼ inch cylindrical tablets. A typical nickel oxide catalyst is Girdler G65 produced by Chemetron Corp. Suitable catalyst compositions include the following: $NiO$-$Al_2O_3$ or $NiO$-$MgO$ precipitated on kaolin and reduced with hydrogen; and also in parts by weight Ni 100, $ThO_2$ 6, MgO 12, and Kieselguhr (diatomaceous earth) 400 reduced with hydrogen for 2 hours at 752°F. followed by heating at 932°F. The life of the catalyst may be extended by maintaining the sulfur level in the reactant gases below about 0.005 grains of sulfur per thousand standard cubic feet. The operating temperature in the methanator is in the range of about 390° to 1400°F, and suitably 400° to 700°F. Space velocities range from 100 to 10,000 standard volumes of gas per volume of catalyst ($hr^{-1}$) and pressures range from 1 to 250 atmospheres. Preferably, the pressure in the methanator is substantially the same as that in the gas generator less any relatively minor ordinary drop in the line.

The effluent gas from the methanator catalytic reactor comprises from about 50 to 65 volume percent of methane or higher (dry basis), $H_2O$, $CO_2$ and minor amounts of one or more members of the group $H_2$, CO, $N_2$ and Ar. The water in the effluent gas stream is condensed out and the $CO_2$ is removed in the manner described previously, leaving substantially pure methane (96 volume percent or more). If required, cryogenic refrigeration may be used to separate the methane from nitrogen and argon which may be present in amounts of 0 to 1.0 volume percent. However, because of the difficulty in removing $N_2$ and Ar and the small amounts, if any, that may be present, generally it is not worth while removing them.

It was unexpectedly found that in the methanation reaction, a product gas was produced having a maximum gross heating value of 980 BTU/SCF or more when the mole ratio $H_2$/CO of the feed gas stream to the methanator was in the range of 1 to less than 1.5. This was quite unexpected since commercial methanation processes specify a $H_2$/CO mole ratio of 3, or more.

In another embodiment of the invention which may be used alternatively with sulfur-containing hydrocarbonaceous fuels containing 1 to 7 wt. % sulfur such as liquid hydrocarbon fuel oils or high sulfur coal or mixtures thereof, a unique sulfur resistant methanation catalyst comprising in wt. % CoO 3.2, $MoO_3$ 15.7, and $Al_2O_3$ 81.1 such as described in coassigned U.S. application Ser. No. 429,470 filed simultaneously herewith, is used as the catalyst in the methanation step. In this second embodiment, the effluent gas stream from the generator is cooled to a temperature in the range of about 400° to 800°F. by direct or indirect heat exchange as previously described, particulate carbon and $H_2O$ are removed, and the process gas stream is introduced into the catalytic methanator. After methanation at a temperature in the range of about 500° to 1500°F. and suitably 500° to 800°F. and a pressure in the range of about 1 to 250 atmospheres, the effluent gas stream from the methanation zone comprises mixtures of $CH_4$ and one or more members of the group $H_2$, CO, $H_2O$, $CO_2$, COS, $H_2S$, $N_2$ and Ar. This effluent gas stream is cooled and one or more members of said group are removed in a conventional gas purification zone. For example, $H_2O$, $CO_2$, $H_2S$, and COS may be removed.

The subject invention has the following significant advantages over other schemes for making fuel gas:

1. A higher methane content and heating value are obtained that are possible for a methanator operating with the conventional 3:1 $H_2$/CO mole ratio at a given reactor temperature.

2. Oxygen and steam requirements will be reduced in comparison with U.S. Pat. No. 3,688,438 since the generator will operate at a lower O/C ratio.

3. Substantial reduction in generator and waste heat boiler size since the large steam volume will have been reduced by about 50–90 percent.

4. The shift converter (either thermal or catalytic) proposed in some other schemes can be eliminated since the 3:1 $H_2$:CO ratio is no longer required as feed to the methanator.

5. Lower $CO_2$ production in comparison with U.S. Pat. No. 3,688,438 will reduce the load on the acid gas removal section and may even permit the direct handling of the $H_2$/$CO_2$ stream in a Claus unit rather than having to separate the $H_2S$ and the $CO_2$.

6. With sulfur resistant catalysts, it is not necessary to remove the acid gases, at least not completely, before the methanator. Thus, if a gas purification step is required, it may be performed once only after the methanation step.

EXAMPLE

The following example is offered as a better understanding of the present invention but the invention is not to be construed as unnecessarily limited thereto.

EXAMPLE I

Run No. 1 — On an hourly basis about 372 pounds of a residual oil feedstock at a temperature of 240°F. are introduced into a free-flow non-catalytic synthesis gas generator by way of an annulus-type burner. The oil feedstock has an API gravity of 12.8, a viscosity of 573 Saybolt seconds Furol 122°F., and a heat of combustion of 18020 BTU (British Thermal Units) per pound. The oil feedstock has the following ultimate analysis in weight %: C 84.1, H 10.6, O 0.0, N 0.7, S 4.5, and ash 0.01.

Simultaneously, 260 pounds of $H_2O$ at a temperature of 790°F. and 4438 SCFH (Standard Cubic Feet per Hour) of substantially pure oxygen (99 mole % $O_2$ or more) at a temperature of 255°F. are charged into the gas generator. The weight ratio $H_2O$/fuel is 0.70 and the atomic ratio of $O_2$ in the substantially pure oxygen to carbon in the fuel is 0.898.

Reation takes place between the feedstreams in the reaction zone at a pressure of about 100 atmospheres and at an autogenous temperature of 2200°F. The average residence time in the 2 cubic ft. reaction zone is about 6.9 seconds. By the partial oxidation reaction, the hydrocarbonaceous feedstream is converted into 19117 SCFH of an effluent gss stream having the following dry gas composition in mole percent: CO 40.2, $H_2$ 48.6, $CO_2$ 9.2, $CH_4$ 1.1, ($N_2$+Ar) 0.2, $H_2S$ 0.7, and COS 0.03. In addition, 6 pounds per hour of particulate carbon is entrained in the effluent gas stream from the gas generator.

The process gas stream leaving the gas generator is cooled to a temperature of 650°F. by indirect heat exchange with water in a waste heat boiler. Simultaneously, steam for recycle to the gas generator is produced in the waste heat boiler. In a manner previously described, the particulate carbon is scrubbed from the process gas stream, and water and the acid gases e.g. $CO_2$, $H_2S$, COS are removed. A stream of dry synthesis gas substantially comprising $H_2$ and CO with a $H_2$/CO mole ratio of about 1.21 and minor amounts of $CH_4$, $N_2$ and Ar is produced.

At a space velocity of 7000 standard volumes of gas per volume of catalyst per hour and at 450°F. the aforesaid stream of dry synthesis gas is introduced into a catalytic methanation reactor. The methanation catalyst comprises in parts by weight Ni 100, $ThO_2$ 6, MgO 12 and Kieselguhr 400. $H_2$ and CO are reacted together in the methanation zone at a pressure of about 95 atmospheres. The methane-rich gas stream leaving the methanator at a temperature of 620°F., has the following composition in mole %: $CH_4$ 50.6, $H_2O$ 8.8, $CO_2$ 39.4, $H_2$ 0.7, CO 0.01. and $N_2$+Ar 0.4.

By methods previously described, $H_2O$ and $CO_2$ are removed from the process gas stream to produce a stream of SCFH of synthetic natural gas having a heat of combustion of 991 BTU/SCF and the following composition in mole %: $CH_4$ 97.7, $H_2$ 1.4, CO 0.02, and $N_2$+Ar 0.80.

Obviously many modifications and variations of the invention as hereinbefore set forth may be made without departing from the spirit and scope thereof, and only such limitations should be imposed as are indicated in the appended claims.

We claim:

1. A process for producing substantially pure methane comprising the steps of (1) reacting a hydrocarbonaceous fuel feed by partial oxidation with substantially pure oxygen comprising 95 mole % $O_2$ or more and $H_2O$ at an autogenous temperature in the range of about 1700° to 3100°F. and a pressure in the range of about 1 to 250 atmospheres in the reaction zone of a free-flow unpacked noncatalytic synthesis gas generator, wherein the weight ratio of $H_2O$/ hydrocarbonaceous fuel is in the range of 0.25 to 1.7, the atomic ratio of oxygen in the substantially pure oxygen to carbon in the hydrocarbonaceous fuel is in the range of 0.85 to 1.0, and the stream of effluent gas leaving said synthesis gas generator principally comprises mixtures of $H_2$ and CO having a mole ratio $H_2$/CO in the range of 1.0 to below 1.5, $H_2O$, $CO_2$, and one or more members of the group $CH_4$,COS, $H_2S$, Ar, and $N_2$ and particulate carbon; (2) cooling the process gas stream from (1) and separating particulate carbon, $H_2O$, $CO_2$, $H_2S$, and COS therefrom, thereby producing a stream of dry feedgas; (3) introducing the stream of dry feedgas from (2) without a separate water-gas shift step into a catalytic methanation zone where $H_2$ and CO are reacted together at a temperature in the range of about 390° to 1000°F. and at a pressure in the range of about 1 to 250 atmospheres to produce a methane-rich gas stream principally comprising $CH_4$ and containing $H_2O$, $CO_2$ and one or more members of the group $H_2$, CO, Ar, and $N_2$; and (4) separating said $H_2O$ and $CO_2$ from the methane-rich gas stream from (3), producing a product gas stream comprising about 90 or more mole % $CH_4$ and having a gross heating value of 920 BTU/SCF or more.

2. The process of claim 1 wherein the substantially pure oxygen in step (1) comprises 99 mole % $O_2$ or more and the gas stream from step (4) has a gross heating value of at least 980 BTU/SCF.

3. The process of claim 1 wherein the pressure in said synthesis gas generator is in the range of about 20 to 200 atmospheres.

4. The process of claim 1 wherein the pressure in steps (2) to (4) is substantially the same as in the gas generator in step (1), less ordinary drop in the lines.

5. The process of claim 1 wherein at least a portion of the hydrocarbonaceous fuel feed in step (1) comprises a pumpable slurry of a solid hydrocarbonaceous fuel selected from the group consisting of the particulate carbon separated in step (2), coal, and petroleum coke in admixture with a liquid selected from the group consisting of liquid hydrocarbon fuel and water.

6. The process of claim 1 wherein said hydrocarbonaceous fuel feed in step (1) is a liquid hydrocarbon selected from the group consisting of petroleum distillate, naphtha, gas oil, residual fuel, reduced crude, whole crude, asphalt, coal tar shale oil, and tar sand oil, and mixtures thereof.

7. A process for producing synthetic natural gas from a sulfur-containing hydrocarbonaceous fuel comprising the steps of (1) reacting said hydrocarbonaceous fuel feed by partial oxidation with substantially pure oxygen comprising 95 mole % $O_2$ or more and $H_2O$ at an autogenous temperature in the range of about 1700° to 3100°F and a pressusre in the range of about 1 to 250 atmospheres in the reaction zone of a free-flow unpacked noncatalytic synthesis gas generator, wherein the weight ratio of $H_2O$/hydrocarbonaceous fuel is in the range of about 0.025 to 1.7 and the mole ratio of oxygen in the substantially pure oxygen to carbon in the hydrocarbonaceous fuel is in the range of about 0.85 to 1.0, and the stream of effluent gas leaving the synthesis gas generator principally comprises $H_2$ and CO having a mole ratio $H_2/CO$ in the range of about 1.0 to below 1.5, $H_2O$, $CO_2$ and one or more members of the group $CH_4$, COS, $H_2S$, Ar, and $N_2$, and particulate carbon; (2) cooling the process gas stream from (1) to a temperature in the range of about 400° to 800°F by indirect heat exchange with water thereby producing steam; (3) separating particulate carbon and $H_2O$ from the process gas stream from (2); (4) introducing the process gas stream from (3) without a separate water-gas shift step into a methanation zone containing a sulfur-resistant methanation catalyst where said $H_2$ and CO are reacted together at a temperature in the range of about 500° to 1500°F and at a pressure in the range of about 1 to 250 atmospheres to produce a methane-rich gas stream comprising mixtures of $CH_4$ and one or more members of the group $H_2O$, $CO_2$, $N_2$, COS, $H_2S$, Ar, and $N_2$; and (5) cooling the methane-rich gas stream from (4), and separating said $H_2O$, $CO_2$, $H_2S$ therefrom producing a product gas stream comprising about 90 or more mole % $CH_4$ and having a gross heating value of 920 BTU/SCF or more.

8. The process of claim 7 wherein said hydrocarbonaceous fuel containg from about 1 to 7 wt. % sulfur and is selected from the group consisting of liquid hydrocarbon fuel, coal, and mixtures thereof.

9. The process of claim 7 wherein the catalyst in step (4) comprises in wt. % CoO 3.2, $MoO_3$ 15.7, and $Al_2O_3$ 81.1.

10. The process of claim 7 wherein the pressure in each of the steps (2) to (4) is about the same as the pressure in the gas generator in step (1) less ordinary drop in the lines.

11. The process of claim 7 provided with the step of separating from the process gas stream from step (5) one or more members of the group Ar, $N_2$, $H_2$, and CO.

12. The process of claim 1 wherein the temperature in the methanation zone in step (3) is in the range of about 400° to 700°F.

* * * * *

UNITED STATES PATENT AND TRADEMARK OFFICE
CERTIFICATE OF CORRECTION

PATENT NO. : 3,928,001
DATED : December 23, 1975
INVENTOR(S) : E. T. Child et al It is certified that error appears in the above-identified patent and that said Letters Patent are hereby corrected as shown below:

| | |
|---|---|
| Column 2, line 65 | After "of" insert --interest here is 1.0--. |
| Column 3, line 2 | Change "Ch$_4$" to --CH$_4$--. |
| Column 4, line 1 | Change "menas" to --means--. |
| Column 6, line 57 | Change "H$_2$/CO$_2$" to --H$_2$S/CO$_2$--. |
| Column 8, line 64 | Change "0.025" to --0.25--. |

Signed and Sealed this

Thirteenth Day of June 1978

[SEAL]

Attest:

RUTH C. MASON
Attesting Officer

DONALD W. BANNER
Commissioner of Patents and Trademarks